US009684574B2

(12) United States Patent
Zhou

(10) Patent No.: US 9,684,574 B2
(45) Date of Patent: Jun. 20, 2017

(54) METHOD AND SYSTEM FOR IMPLEMENTING REMOTE DISASTER RECOVERY SWITCHING OF SERVICE DELIVERY PLATFORM

(71) Applicant: ZTE CORPORATION, Shenzhen, Guangdong Province (CN)

(72) Inventor: Zhaoyang Zhou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 75 days.

(21) Appl. No.: 14/429,078

(22) PCT Filed: Aug. 8, 2013

(86) PCT No.: PCT/CN2013/081036
§ 371 (c)(1),
(2) Date: Mar. 18, 2015

(87) PCT Pub. No.: WO2013/185727
PCT Pub. Date: Dec. 19, 2013

(65) Prior Publication Data
US 2015/0278047 A1    Oct. 1, 2015

(30) Foreign Application Priority Data
Nov. 8, 2012  (CN) .......................... 2012 1 0443595

(51) Int. Cl.
*G06F 11/20*        (2006.01)
*H04L 12/26*        (2006.01)
(Continued)

(52) U.S. Cl.
CPC ...... *G06F 11/2033* (2013.01); *G06F 11/0709* (2013.01); *G06F 11/0757* (2013.01); *H04L 41/0672* (2013.01); *H04L 43/0817* (2013.01)

(58) Field of Classification Search
USPC ......................................................... 714/4.11
See application file for complete search history.

(56) References Cited

U.S. PATENT DOCUMENTS 7,515,597 B1 * 4/2009 Chambers ........... H04M 3/5183
                                                    370/386
7,761,743 B2 * 7/2010 Talaugon ............ G06F 11/2028
                                                    714/21
(Continued)

FOREIGN PATENT DOCUMENTS

CN          1609814 A    4/2005
CN        101505285 A    8/2009
(Continued)

*Primary Examiner* — Kamini Patel
(74) *Attorney, Agent, or Firm* — Ling Wu; Stephen Yang; Ling and Yang Intellectual Property

(57) ABSTRACT

A system and method for implementing geographic disaster tolerance switching on a service delivery platform are disclosed. The system includes: a bidirectional monitoring module, an intelligent recognition module, and an automatic switching module, wherein: the bidirectional monitoring module is configured to: monitor an active site and a standby site of the service delivery platform, and when detecting that an abnormity occurs on the active site or the standby site and an alarm reporting condition is satisfied, report alarm information to the intelligent recognition module; the intelligent recognition module is configured to: receive the alarm information, and judge whether a preset switching rule is satisfied, if yes, then send a disaster tolerance switching instruction to the automatic switching module; and the automatic switching module is configured to: start an active-standby switching between the active site and the standby site after receiving the disaster tolerance switching instruction.

17 Claims, 3 Drawing Sheets

(51) Int. Cl.
*H04L 12/24* (2006.01)
*G06F 11/07* (2006.01)

(56) References Cited

U.S. PATENT DOCUMENTS

| | | | | |
|---|---|---|---|---|
| 2003/0028635 A1* | 2/2003 | DeMent | ............... | H04Q 3/0025 709/225 |
| 2005/0193225 A1* | 9/2005 | Macbeth | ............. | G06F 11/0709 714/2 |
| 2006/0036890 A1* | 2/2006 | Henrickson | ......... | G06F 11/1469 714/2 |
| 2009/0187413 A1* | 7/2009 | Abels | ..................... | G06Q 10/10 705/1.1 |
| 2011/0010581 A1* | 1/2011 | Tanttu | ................... | G06F 9/5038 714/11 |
| 2012/0209807 A1* | 8/2012 | Li | ........................... | G06F 11/16 707/610 |
| 2012/0269057 A1* | 10/2012 | Zhao | ....................... | H04B 1/74 370/228 |
| 2012/0311614 A1* | 12/2012 | DeAnna | .................. | H04L 67/10 719/328 |
| 2014/0372384 A1* | 12/2014 | Long | ................ | G06F 17/30289 707/679 |
| 2015/0254271 A1* | 9/2015 | Ouyang | ............ | G06F 17/30194 707/610 |
| 2016/0205037 A1* | 7/2016 | Gupte | .................... | H04L 67/10 709/226 |

FOREIGN PATENT DOCUMENTS

| CN | 101582787 A | 11/2009 |
|---|---|---|
| WO | 2012012962 A1 | 2/2012 |

\* cited by examiner

METHOD AND SYSTEM FOR IMPLEMENTING REMOTE DISASTER RECOVERY SWITCHING OF SERVICE DELIVERY PLATFORM

TECHNICAL FIELD

The present document relates to the mobile Internet field, and particularly, to a method and system for implementing geographic disaster tolerance switching on a service delivery platform.

BACKGROUND OF THE RELATED ART

As a core service platform that operators carry out integration, fusion, openness and innovation across a telecom domain and an Internet domain, the Service Delivery Platform (SDP) achieves vigorous development. With commercialization of the platform, the number of carried subscribers becomes larger and larger, and the service data increase exponentially. While much more value is created for the operators by the huge quantities of subscribers and services, more and more losses are produced due to system breakdown or data loss. Therefore, the operators propose higher and higher demands on security, reliability and high applicability of the service delivery platform. At present, the service delivery platform usually adopts the following several solutions to provide corresponding security mechanism:

1. Core network elements of the service delivery platform are deployed in the same machine room or site, and the deployment is in a dual-computer or cluster mode, so as to provide the disaster tolerance guarantee. The defect of this solution is that, it can only deal with problems caused by the single point of failure of servers.

2. A set of standby system of the service delivery platform is deployed in a remote place which is at a certain distance to the service delivery platform, and the standby system keeps data synchronization with an active site. This solution can guarantee the services can be switched onto the remote standby site (which is also called as a disaster tolerance site) in a certain time even when uncontrollable disasters, such as man-made damage, flood, fire hazard, earthquake and so on, occur on the active site, so that the service system can continue to come into use after a short time of interruption, thereby improving the disaster tolerance capability of the service delivery platform against various possible destruction factors.

For the second solution of active-standby geographic disaster tolerance, as the internal modules of the service delivery platform are complicated and the external interfaces are diverse and complex, only manual switching can be implemented at present, where many operation steps are required to execute and the operations are complex. At present, there are no mature techniques and means to implement the geographic disaster tolerance switching in an automatic switching way due to diversity and complexity of the platforms.

SUMMARY OF THE INVENTION

The embodiments of the present document provide a method and system for implementing geographic disaster tolerance switching on a service delivery platform, to simplify the switching operation and improve the switching efficiency.

The embodiment of the present document provides a system for implementing geographic disaster tolerance switching on a service delivery platform, comprising: a bidirectional monitoring module, an intelligent recognition module, and an automatic switching module, wherein:

the bidirectional monitoring module is configured to: monitor an active site and a standby site of the service delivery platform, and report alarm information to the intelligent recognition module when detecting that an abnormity occurs on the active site or the standby site and an alarm reporting condition is satisfied;

the intelligent recognition module is configured to: receive the alarm information reported by the bidirectional monitoring module, and judge whether a preset switching rule is satisfied, if the preset switching rule is satisfied, then send a disaster tolerance switching instruction to the automatic switching module; and the automatic switching module is configured to: start an active-standby switching between the active site and the standby site after receiving the disaster tolerance switching instruction sent by the intelligent recognition module.

The above system can also have the following features: the system further comprises: a service interception module and a client interception module, wherein:

the automatic switching module is configured to start the active-standby switching between the active site and the standby site in the following way:

sending an instruction to the service interception module and the client interception module, triggering internal logic switching of various subsystems within the service delivery platform;

the service interception module is configured to: after receiving the instruction sent by the automatic switching module, set a service interception port as available or unavailable according to the instruction; and the client interception module is configured to: after receiving the instruction sent by the automatic switching module, start or close a link between the service delivery platform and a service engine according to the instruction.

The above system can also have the following features: the service interception module is configured to set the service interception port as available or unavailable according to the instruction in the following way:

according to the instruction, setting a service interception port of the active site as unavailable, and/or, setting a service interception port of the standby site as available.

The above system can have the following features: the client interception module is configured to start or close the link between the service delivery platform and the service engine according to the instruction in the following way:

according to the instruction, starting the link between the service delivery platform on the standby site and the service engine, and/or, closing the link between the service delivery platform on the active site and the service engine.

The above system can also have the following features: the intelligent recognition module is configured to judge whether a preset switching rule is satisfied in the following way:

determining that the switching rule is satisfied when a duration of abnormity happening exceeds a tolerance duration threshold, and/or, the number of times of abnormity happening reaches a preset threshold in one preset time window, wherein the abnormity is happened on a core process, a critical link or a combination of the core process and the critical link of the service delivery platform each of which is pre-defined.

The above system can also have the following features:
when the bidirectional monitoring modules, the intelligent recognition modules, the automatic switching modules, the service interception modules and the client interception modules are deployed on the active site and the standby site at the same time, or, when the system comprises two groups of the bidirectional monitoring modules, the intelligent recognition modules, the automatic switching modules, the service interception modules and the client interception modules and the two groups are deployed on the active site and the standby site respectively, a heartbeat connection is established between the same modules among the above modules deployed on the two sites, and whether the opposite party works normally is detected periodically.

The above system can also have the following features:

when the bidirectional monitoring modules, the intelligent recognition modules, the automatic switching modules, the client interception modules and the service interception modules are deployed on the active site and the standby site at the same time, the intelligent recognition modules on the two sites perform backup for each other, one of the intelligent recognition modules is in a working state and the other one is in a sleep state, and the intelligent recognition module in the working state controls the automatic switching modules deployed on the active site and the standby site.

The above system can also have the following features:

when the intelligent recognition modules, the automatic switching modules, the client interception modules and the service interception modules are deployed on the active site and the standby site at the same time, for any one of the automatic switching modules, the client interception modules and the service interception modules on the two sites, if the modules on both of the two sites work normally, then the modules are in the working state; if the modules on one site are normal and the modules on the other site are abnormal, then the normal modules take over the work of the abnormal modules.

The above system can also have the following features:

when the bidirectional monitoring modules are deployed on the active site and the standby site at the same time, if the bidirectional monitoring modules on the two sites are normal, then both of the bidirectional monitoring modules are in the working state, and the bidirectional monitoring module, which is at the same site with the intelligent recognition module in the working state, reports the alarm information to the intelligent recognition module in the working state; if the bidirectional monitoring module on only one site is normal, the normal bidirectional monitoring module reports the alarm information to the intelligent recognition module in the working state.

The embodiment of the present document also provides a method of implementing geographic disaster tolerance switching on a service delivery platform, comprising:

monitoring an active site and a standby site of the service delivery platform, and generating alarm information when detecting that an abnormity occurs on the active site or the standby site and an alarm reporting condition is satisfied; and judging whether a preset switching rule is satisfied according to the alarm information, and if the preset switching rule is satisfied, starting an active-standby switching between the active site and the standby site.

The above method can also have the following features: the step of starting an active-standby switching between the active site and the standby site comprises:

triggering internal logic switching of various subsystems within the service delivery platform, setting a service interception port of the active site as unavailable, closing a link between the service delivery platform on the active site and a service engine; and/or, setting a service interception port of the standby site as available, and starting a link between the service delivery platform on the standby site and the service engine.

The above method can also have the following features: the step of judging whether a preset switching rule is satisfied comprises:

determining that the switching rule is satisfied when a duration of abnormity happening exceeds a tolerance duration threshold, and/or, the number of times of abnormity happening reaches a preset threshold in one preset time window, wherein the abnormity is happened on a core process, a critical link or a combination of the core process and the critical link of the service delivery platform each of which is pre-defined.

The above method can also have the following features: at least on one of the active site and the standby site deploys with a bidirectional monitoring module, an intelligent recognition module, an automatic switching module, a client interception module and a service interception module, wherein:

the step of monitoring an active site and a standby site of the service delivery platform, and generating alarm information when detecting that an abnormity occurs on the active site or the standby site and an alarm reporting condition is satisfied comprises:

the bidirectional monitoring module monitoring the active site and the standby site of the service delivery platform, and reporting the alarm information to the intelligent recognition module when detecting that the abnormity occurs in the active site or the standby site and the alarm reporting condition is satisfied;

the step of judging whether a preset switching rule is satisfied according to the alarm information comprises:

the intelligent recognition module receiving the alarm information reported by the bidirectional monitoring module, and judging whether the preset switching rule is satisfied, if the preset switching rule is satisfied, then sending a disaster tolerance switching instruction to the automatic switching module;

the step of starting an active-standby switching between the active site and the standby site comprises:

after receiving the disaster tolerance switching instruction, the automatic switching module sending an instruction to the service interception module and the client interception module, triggering the internal logic switching of various subsystems within the service delivery platform;

after receiving the instruction sent by the automatic switching module, the service interception module setting a service interception port as available or unavailable according to the instruction; and after receiving the instruction sent by the automatic switching module, the client interception module starting or closing a link between the service delivery platform and a service engine according to the instruction.

The above method can also have the following features: the method further comprises:

when the bidirectional monitoring modules, the intelligent recognition modules, the automatic switching modules, the service interception modules and the client interception modules are deployed on the active site and the standby site at the same time, or, when the system comprises two groups of the bidirectional monitoring modules, the intelligent recognition modules, the automatic switching modules, the service interception modules and the client interception modules and the two groups are deployed on the active site and the standby site respectively, establishing a heartbeat connection between the same modules among the above modules deployed on the two sites, and detecting whether the opposite party works normally periodically.

The above method can also have the following features: the method further comprises:

when the bidirectional monitoring modules, the intelligent recognition modules, the automatic switching modules, the client interception modules and the service interception modules are deployed on the active site and the standby site at the same time, the intelligent recognition modules on the two sites performing backup with each other, wherein one of the intelligent recognition modules is in a working state and the other one is in a sleep state, and the intelligent recognition module in the working state controls the automatic switching modules deployed on the active site and the standby site.

The above method can also have the following features: the method further comprises:

when the intelligent recognition modules, the automatic switching modules, the client interception modules and the service interception modules are deployed on the active site and the standby site at the same time, for any one of modules among the automatic switching modules, the client interception modules and the service interception modules on the two sites, if the modules on both of the two sites work normally, then the modules all being in the working state; if the modules on one site are normal and the modules on the other site are abnormal, then the normal modules taking over the work of the abnormal modules.

The above method can also have the following features: the method further comprises:

when the bidirectional monitoring modules are deployed on the active site and the standby site at the same time, if the bidirectional monitoring modules on the two sites are normal, then both of the bidirectional monitoring modules being in the working state, and the bidirectional monitoring module, which is at the same site with the intelligent recognition module in the working state, reporting the alarm information to the intelligent recognition module in the working state; if the bidirectional monitoring module on only one site is normal, the normal bidirectional monitoring module reporting the alarm information to the intelligent recognition module in the working state.

By applying the method and system provided by the embodiments of the present document, it can be guaranteed that monitoring on the active site and the standby site of the service delivery platform is performed effectively in various predictable complex situations; when the active site goes wrong and can't provide services to the external, the abnormity can be captured in time, and intelligent recognition is performed according to the preset condition and in combination with the abnormal situation, to ensure that the switching is the effective one and is necessary; and afterwards, a series of switching operations are triggered automatically, thereby implementing the automatic disaster tolerance switching promptly.

PREFERRED EMBODIMENTS OF THE PRESENT INVENTION

Hereinafter the embodiments of the present document will be described in detail in combination with accompanying drawings. It should be noted that, under the condition of no confliction, the embodiments and the features in the embodiments in the present application can be combined with one another in any way.

Embodiment 1

Figure 1:
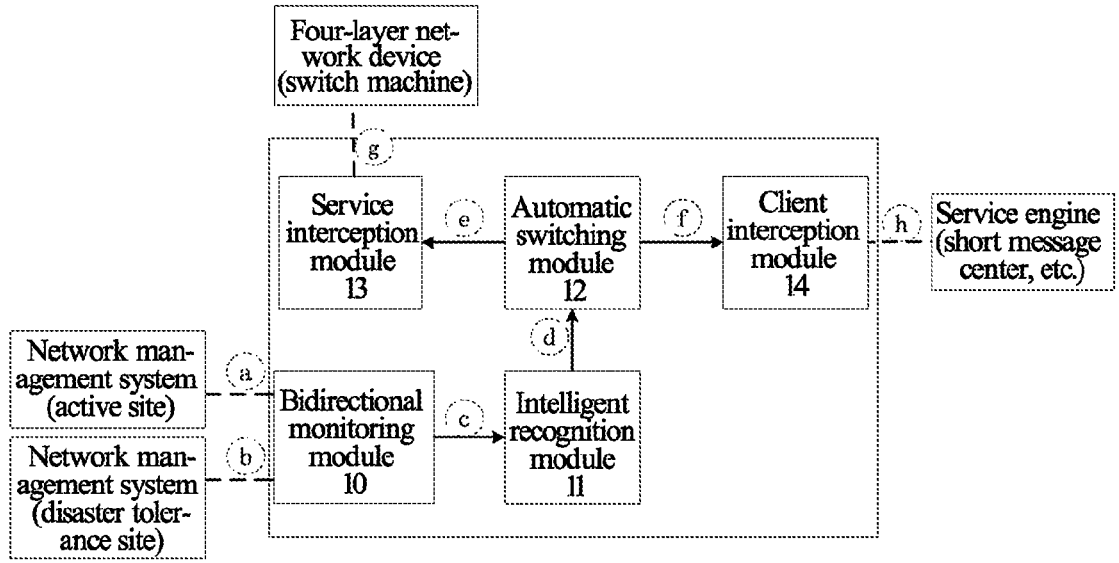
FIG. 1 is a block diagram of a system for implementing geographic disaster tolerance switching on a service delivery platform according to an embodiment of the present document.

As shown in FIG. 1, the present embodiment provides a system for implementing geographic disaster tolerance switching on a service delivery platform, and the system comprises: a bidirectional monitoring module 10, an intelligent recognition module 11, an automatic switching module 12, a service interception module 13 and a client interception module 14, wherein:

the bidirectional monitoring module 10 is configured to: monitor an active site and a standby site of the service delivery platform, and when an abnormity occurs on the active site or the standby site and an alarm reporting condition is satisfied, report alarm information to the intelligent recognition module, wherein, the alarm information can also be reported simultaneously to a network management system deployed on the respective site;

the intelligent recognition module 11 is configured to: receive the alarm information reported by the bidirectional monitoring module 10, and judge whether a preset switching rule is satisfied, if the preset switching rule is satisfied, then send a disaster tolerance switching instruction to the automatic switching module 12;

the automatic switching module 12 is configured to: start an active-standby switching between the active site and the standby site after receiving the disaster tolerance switching instruction sent by the intelligent recognition module 11. The switching includes a switching between an external service port and an external link, and a switching among internal logics of the service delivery platform. The automatic switching module 12 is configured to start the active-standby switching between the active site and the standby site in the following way: sending an instruction to the service interception module 13 and the client interception module 14, triggering the switching among the internal logics of various subsystems within the service delivery platform, that is, to triggering the various subsystems within the active site of the service delivery platform to close the services to the external and become the standby site of the service delivery platform. At the same time, make an opposite operation is performed on the standby site, that is, carrying out switching to the standby site, starting the services to the external and becoming the active site of the service delivery platform, thereby completing the disaster tolerance switching;

the service interception module 13 is configured to: after receiving the instruction sent by the automatic switching module 12, set a service interception port as available or unavailable according to the instruction; and the client interception module 14 is configured to: after receiving the instruction sent by the automatic switching module 12, start or close the link between the service delivery platform and a service engine according to the instruction.

The intelligent recognition module 11 may define a core process, a critical link or a combination of the core process and the critical link which affect services to the external of the service delivery platform, define a monitored state (normal, abnormal) of the core process, the critical link or the combination of the core process and the critical link, define a threshold of the number of times of abnormity happening and a tolerance duration threshold of abnormity happening to the core process, the critical link or the combination of the core process and the critical link, and define a time window (a period of time) corresponding to the threshold of the number of times of the abnormity happening to the core process, the critical link or the combination of the core process and the critical link. When the intelligent recognition module 11 discovers that, in one time window the number of times of the abnormity happening of the monitored core process, the critical link or the combination of the core process and the critical link of the service delivery platform reaches the threshold, and/or, the duration of the abnormity happening exceeds the tolerance duration threshold of the abnormity happening, the intelligent recognition module 11 notifies the automatic switching module 12 to perform the disaster tolerance switching, thereby avoiding frequent and invalid switching between the two sites.

The service interception module 13 comprises a service interception port independent of a service port of the service delivery platform. The service interception port is configured to: identify whether the service delivery platform can provide services when being used as a server end. After receiving a disaster tolerance switching instruction from the automatic switching module 12, the service interception module 13 determines to set the service interception port as available or unavailable according to the actual instruction, that is to set the service interception port on the active site as unavailable, and set the service interception port of the standby site as available. When the service interception port is set as unavailable, a four-layer network device will intercept that the port is unavailable, and then will switch into a site of the service delivery platform with the available port, thus the Hyper Text Transport Protocol (HTTP) request initiated to the service delivery platform by an external server/client (Web/Client) will be redirected to the available site of the service delivery platform.

The client interception module 14 is configured to: intercept the instruction from the automatic switching module 12, and start or close the link when the service delivery platform is used as a client end according the instruction. After receiving a switching instruction from the automatic switching module 12, the client interception module 14 modifies a link configuration file between the active site of the service delivery platform and the service engine, and shields the link between the active site of the service delivery platform and the service engine to interrupt messages between the active site and the various service engines; and modifies a link configuration file between the standby site of the service delivery platform and the service engine, and starts the link between the standby site of the service delivery platform and the service engine to establish normal message receiving and sending channels between the standby site and the various service engines.

The automatic switching module 12, according to the disaster tolerance switching instruction sent by the intelligent recognition module 11 and in light of a preset synergistic switching step, completes the disaster tolerance switching in sequence as follows: firstly, starting the switching to an external server end, secondly, starting the switching to an external client end; and finally, triggering the switching of the internal logics of various subsystems within the service delivery platform. Of course, it is not limited to this sequence.

One switching way is that: after receiving the disaster tolerance switching instruction from the intelligent recognition module 11, the automatic switching module 12 firstly carries out the switching on the active site and then on the standby site. That is, for the active site, the service interception module 13 and the client interception module 14 which are located on the active site are notified to set by the service interception module 13 the service interception port as unavailable, and modify by the client interception module 14 the link configuration file between the active site of the service delivery platform and each service engine and shield the link between the active site of the service delivery platform and each service engine; afterwards, for the standby site, the service interception module 13 and the client interception module 14 on the standby site are notified to set by the service interception module 13 the service interception port as available, and modify by the client interception module 14 the link configuration file between the standby site of the service delivery platform and each service engine and start the link between the standby site of the service delivery platform and each service engine.

There may be only one group of the bidirectional monitoring module 10, the intelligent recognition module 11, the automatic switching module 12, the service interception module 13 and the client interception module 14 which is located on the active site or the standby site. In this case, the automatic switching module 12, the service interception module 13 and the client interception module 14 perform control to the two sites. The automatic switching module 12 triggers the switching of the internal logics of the various subsystems within the service delivery platforms located on the active site and the standby site, and the service interception module 13 sets the service interception port of the active site as unavailable and sets the service interception port of the standby site as available. The client interception module 14, according to the instruction, starts each link between the service delivery platform on the standby site and the service engine, and closes each link between the service delivery platform on the active site and the service engine.

Figure 5:
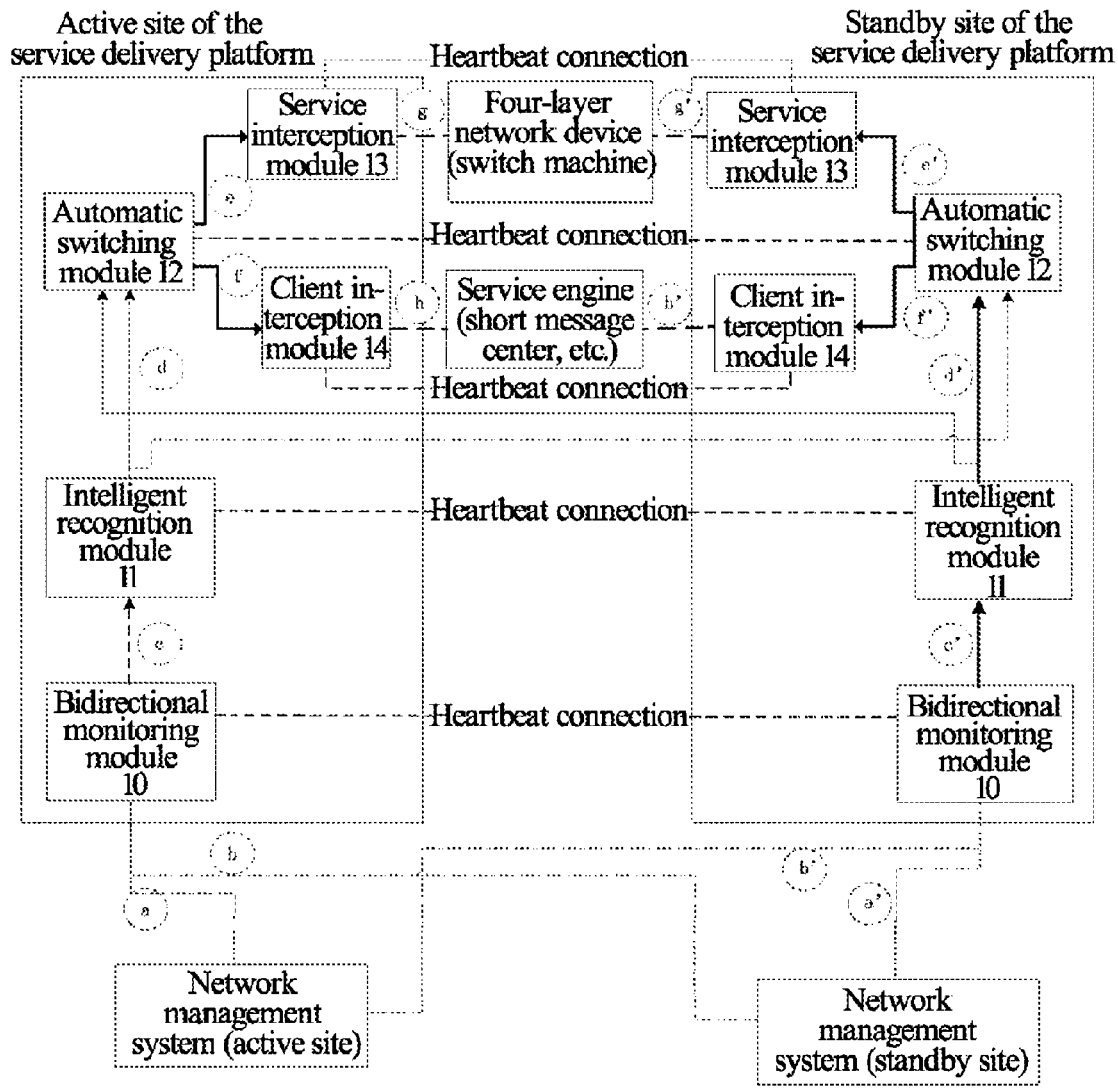
FIG. 5 is a schematic diagram of module interaction between an active site and a standby site according to an embodiment of the present document.

Alternatively, the system comprises two groups of modules, each of the two groups includes the bidirectional monitoring module 10, the intelligent recognition module 11, the automatic switching module 12, the service interception module 13 and the client interception module 14, and the two groups are located on the active site and the standby site respectively, as shown in FIG. 5.

1) Heartbeat connections are established, in which each heartbeat connection is established between the same modules in the above various modules deployed on the two sites, and whether the opposite party works normally is detected periodically.

2) The intelligent recognition modules 11 on the two sites perform backup for each other, one of which is in a working state and the other one is in a sleep state, and the intelligent recognition module 11 in the working state controls the automatic switching modules deployed on the active site and the standby site; i.e., if it is determined to perform the switching, the intelligent recognition module 11 sends a disaster tolerance switching instruction to the automatic switching modules 12 on the two sites. Optionally, when both of the two intelligent recognition modules 11 work normally, the intelligent recognition module 11 on the standby site is in the working state.

3) When both of the bidirectional monitoring modules 10 work normally, the bidirectional monitoring module 10 deployed on the active site or the standby site (optionally, the standby site) of the service delivery platform is responsible for reporting the alarm information to the intelligent recognition module 11 on the site on which the bidirectional monitoring module 10 is located. When one of the bidirectional monitoring modules works normally and the other one works abnormally, the normal bidirectional monitoring module 10 reports the alarm information to the intelligent recognition module 11 which is in the working state.

4) For any module of the automatic switching modules 12, the client interception modules 14 and the service monitoring modules 13 on the two sites, if all of the modules on the two sites work normally, then all the modules are in the working state; if the modules on one site are normal and the modules on the other site are abnormal, then the normal modules take over the work of the abnormal modules.

In normal condition, the automatic switching modules 12, the service interception modules 13 and the client interception modules 14 which are located on the active site and the standby site respectively receive the respective instruction from upstream. Each of the automatic switching modules 12, the service interception modules 13 and the client interception modules 14 which are located on the active site and the standby site respectively can take over the work of the opposite party when the opposite party is abnormal.

Specifically, if the automatic switching module 12 on the active site is abnormal, then the automatic switching module 12 on the standby site can take over the work of the automatic switching module 12 on the active site, and can send the instructions to the service interception modules 13 and the client interception modules 14 on the two sites at the same time when receiving the switching instruction from the intelligent recognition module 11, but the instructions sent to the two sites are different. One indicates the service interception module 13 on the active site to set the service interception port on the active site as unavailable, and indicates the client interception module 14 on the active site to close the link between the service delivery platform on the active site and the service engine; the other indicates the service interception module 13 on the standby site to set the service interception port on the standby site as available, and indicates the client interception module 14 on the standby site to start the link between the service delivery platform on the standby site and the service engine.

The above various modules are deployed on the active site and/or the standby site of the service delivery platform, and can know the operation states of the two sites in time by monitoring the active site and the standby site in real time. When finding an abnormity occurs on the active site and it is hard to provide services to the external by the active site, the modules capture the abnormity in time, perform intelligent analysis in combination with the abnormity condition according to the preset condition of the administration, and trigger a series of operations automatically, thereby implementing the automatic disaster tolerance switching promptly.

Embodiment 2

The present embodiment provides a method for implementing geographic disaster tolerance switching on a service delivery platform, and the method comprises:

monitoring an active site and a standby site of the service delivery platform, and generating alarm information when detecting that an abnormity occurs on the active site or the standby site and an alarm reporting condition is satisfied; and judging whether a preset switching rule is satisfied according to the alarm information, and if the preset switching rule is satisfied, starting an active-standby switching between the active site and the standby site.

Wherein, the step of starting an active-standby switching between the active site and the standby site comprises:

triggering internal logic switching of various subsystems within the service delivery platform, setting a service interception port of the active site as unavailable, closing a link between the service delivery platform on the active site and a service engine; and/or, setting a service interception port of the standby site as available, and starting a link between the service delivery platform on the standby site and the service engine.

Wherein, the step of determining whether a switching rule is satisfied comprises:

determining that the switching rule is satisfied when a duration of abnormity happening exceeds a tolerance duration threshold, and/or, the number of times of abnormity happening reaches a preset threshold in one preset time window, wherein the abnormity is happened on a core process, a critical link or a combination of the core process and the critical link of the service delivery platform each of which is pre-defined.

Wherein, the above switching method is implemented by the above system. Wherein, when the bidirectional monitoring modules, the intelligent recognition modules, the automatic switching modules, the service interception modules and the client interception modules are deployed on the active site and the standby site at the same time, a heartbeat connection is established between the same modules among the above modules deployed on the two sites, and whether the opposite party works normally is detected periodically.

Wherein, when the bidirectional monitoring modules, the intelligent recognition modules, the automatic switching modules, the client interception modules and the service interception modules are deployed on the active site and the standby site at the same time, the intelligent recognition modules on the two sites perform backup for each other, one of the intelligent recognition modules is in a working state and the other one is in a sleep state, and the intelligent recognition module in the working state controls the automatic switching modules deployed on the active site and the standby site.

Wherein, the method further comprises:

when the intelligent recognition modules, the automatic switching modules, the client interception modules and the service interception modules are deployed on the active site and the standby site at the same time, for any one of modules among the automatic switching modules, the client interception modules and the service interception modules on the two sites, if the modules on both of the two sites work normally, then the modules all being in the working state; if the modules on one site are normal and the modules on the other site are abnormal, then the normal modules taking over the work of the abnormal modules.

Wherein, the method further comprises: when the bidirectional monitoring modules are deployed on the active site and the standby site at the same time, if the bidirectional monitoring modules on the two sites are normal, then both of the bidirectional monitoring modules being in the working state, and the bidirectional monitoring module, which is at the same site with the intelligent recognition module in the working state, reporting the alarm information to the intelligent recognition module in the working state; if the bidirectional monitoring module on only one site is normal, the normal bidirectional monitoring module reporting the alarm information to the intelligent recognition module in the working state.

The embodiments of the present document will be described in detail below in combination with the accompanying drawings.

Figure 2:
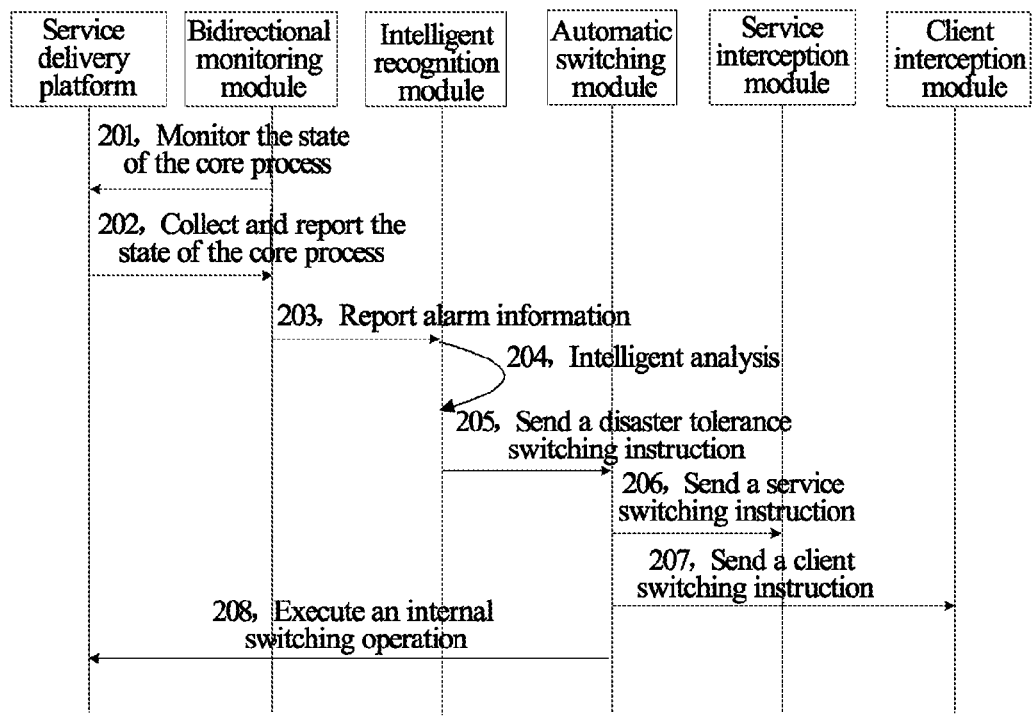
FIG. 2 is a flowchart of a method for implementing geographic disaster tolerance switching on a service delivery platform according to an embodiment of the present document.

As shown in FIG. 2, FIG. 2 is a flowchart of a method of implementing geographic disaster tolerance switching on a service delivery platform, comprising the following steps:

In step 201, a bidirectional monitoring module starts monitoring on a core process of the service delivery platform;

In step 202, when an abnormity occurs in the service delivery platform and an alarm reporting condition is satisfied, the bidirectional monitoring module collects alarm information;

In step 203, the bidirectional monitoring module reports the alarm information to an intelligent recognition module;

In step 204, the intelligent recognition module judges whether a duration of abnormity happening exceeds a tolerance duration threshold of abnormity happening and/or the number of times of abnormity happening reaches a threshold in one time window, wherein the abnormity is happened on a monitored core process, a critical link or a combination of the core process and the critical link of the service delivery platform;

In step 205, if the intelligent recognition module detects that the number of times of the abnormity happening reaches the threshold and/or the duration of the abnormity happening exceeds the tolerance duration threshold of the abnormity happening, the intelligent recognition module sends a disaster tolerance switching instruction to the automatic switching module;

In step 206, after receiving the disaster tolerance switching instruction, the automatic switching module sends a service switching instruction to the service interception module;

In step 207, after receiving the disaster tolerance switching instruction, the automatic switching module sends a client switching instruction to the client interception module;

In step 208, the automatic switching module starts the disaster tolerance switching in the internal of the service delivery platform.

Figure 3:
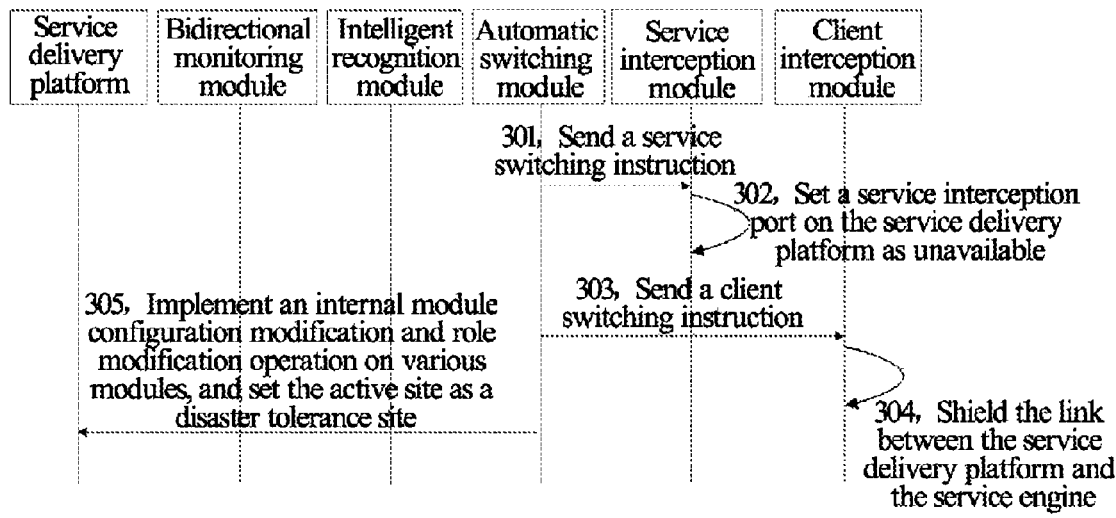
FIG. 3 is a flowchart of active site switching of a method for implementing geographic disaster tolerance switching on a service delivery platform according to an embodiment of the present document.

As shown in FIG. 3, FIG. 3 is a flowchart of disaster tolerance switching on an active site of a method for implementing geographic disaster tolerance switching on a service delivery platform, comprising the following steps:

In step 301, an automatic switching module sends a service switching instruction to a service interception module of the active site of the service delivery platform;

In step 302, the service interception module sets a service interception port on the active site as unavailable;

In step 303, the automatic switching module sends a client switching instruction to a client interception module of the active site of the service delivery platform;

In step 304, the client interception module shields a link between the active site of the service delivery platform and a service engine;

In step 305, the automatic switching module implements an internal module configuration modification and role modification operation on various modules of the active site of the service delivery platform, and sets the active site as a standby site.

Figure 4:
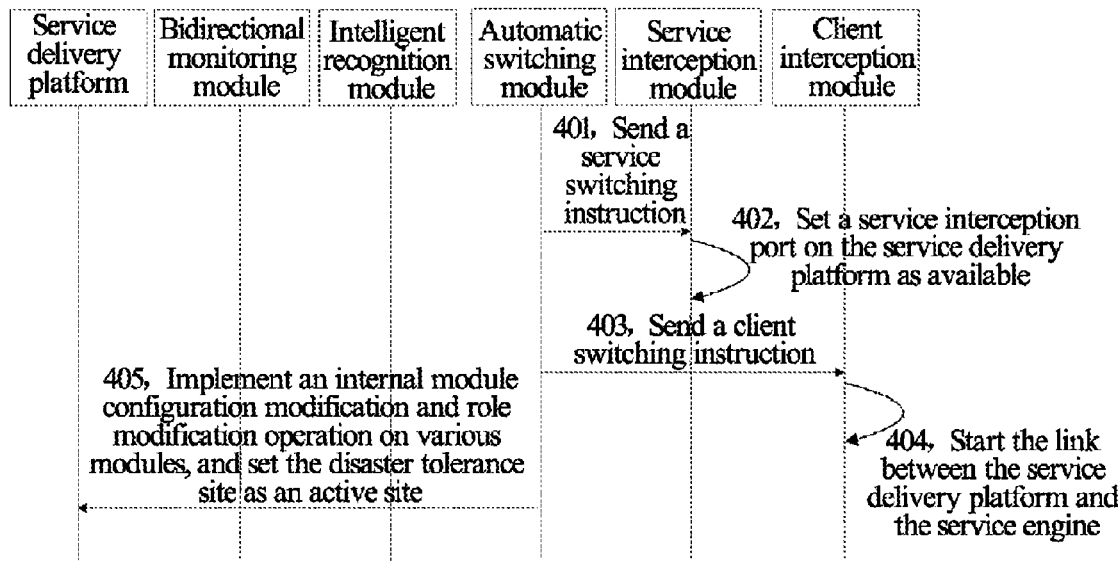
FIG. 4 is a flowchart of standby site switching of the method for implementing geographic disaster tolerance switching on a service delivery platform according to an embodiment of the present document.

As shown in FIG. 4, FIG. 4 is a flowchart of disaster tolerance switching on a standby site of a method of implementing geographic disaster tolerance switching on a service delivery platform, comprising the following steps:

In step 401, an automatic switching module sends a service switching instruction to a service interception module of the standby site of the service delivery platform;

In step 402, the service interception module sets a service interception port on the standby site as available;

In step 403, the automatic switching module sends a client switching instruction to a client interception module of the standby site of the service delivery platform;

In step 404, the client interception module opens a link between the standby site of the service delivery platform and a service engine;

In step 405, the automatic switching module implements an internal module configuration modification and role modification operation on various modules of the standby site of the service delivery platform, and sets the standby site as an active site. Thereby the disaster tolerance switching is implemented.

In conclusion, with the method and system for implementing geographic disaster tolerance switching on a service delivery platform provided by the embodiments of the present document, by performing effective monitoring on the service delivery platform and intelligent analysis on abnormity alarms, the internal logics, external service ports, numerous links and link types of the service delivery platform, all of which are originally complex, are dealt with by classifying; and when determining automatically that the disaster tolerance switching is required to perform, the various modules of the system will make a cooperative processing to complete the geographic disaster tolerance switching on the service delivery platform automatically and quickly.

It should be understood by an ordinary person skilled in the art that all or part of steps in the above method can be completed by means of program instructing relevant hardwires. The program may be stored in a computer readable storage medium, such as a readable memory, a magnet disk or an optical disk, etc. Optionally, all or part of steps of the above embodiments can be implemented by means of one or more integrated circuits. Accordingly, the respective module/unit in the above embodiments can be implemented by use of hardware or software function module. In this way, the embodiments of the present document are not limited to any particular form of a combination of hardware and software.

The above description is only the preferred embodiments of the present document, but is not used to limit the present document. For a person skilled in the art, the embodiments of the present document may have various alterations and changes. Any of modification, equivalent replacement, improvement and so on made within the spirit and principle of the present document should fall into the protection scope of the present document.

INDUSTRIAL APPLICABILITY

By applying the method and system provided by the embodiments of the present document, it can be ensured that monitoring on the active site and the standby site of the service delivery platform is performed effectively, thereby promptly implementing an automatic disaster tolerance switching.

What is claimed is:

1. A system for implementing geographic disaster tolerance switching on a service delivery platform, comprising: a bidirectional monitoring module, an intelligent recognition module, an automatic switching module, a service interception module and a client interception module, wherein:

the bidirectional monitoring module, comprising a non-transitory computer readable storage medium having a computer readable program for causing a computer to: monitor an active site and a standby site of the service delivery platform, and report alarm information to the intelligent recognition module when detecting that an abnormity occurs on the active site or the standby site and an alarm reporting condition is satisfied;

the intelligent recognition module, comprising a non-transitory computer readable storage medium having a computer readable program for causing a computer: receive the alarm information reported by the bidirectional monitoring module, and judge whether a preset switching rule is satisfied, if the preset switching rule is satisfied, then send a disaster tolerance switching instruction to the automatic switching module; and the automatic switching module, comprising a non-transitory computer readable storage medium having a computer readable program for causing a computer to: start an active-standby switching between the active site and the standby site after receiving the disaster tolerance switching instruction sent by the intelligent recognition module;

the service interception module comprises a non-transitory computer readable storage medium having a computer readable program for causing a computer to: after receiving the instruction sent by the automatic switching module, set a service interception port as available or unavailable according to the instruction; and the client interception module comprises a non-transitory computer readable storage medium having a computer readable program for causing a computer to: after receiving the instruction sent by the automatic switching module, start or close a link between the service delivery platform and a service engine according to the instruction;

wherein when the bidirectional monitoring modules, the intelligent recognition modules, the automatic switching modules, the service interception modules and the client interception modules are deployed on the active site and the standby site at the same time, or, when the system comprises two groups of the bidirectional monitoring modules, the intelligent recognition modules, the automatic switching modules, the service interception modules and the client interception modules and the two groups are deployed on the active site and the standby site respectively, a heartbeat connection is established between the same modules among the above modules deployed on the two sites, and whether the opposite party works normally is detected periodically.

2. The system according to claim 1, wherein:

the automatic switching module comprises a non-transitory computer readable storage medium having a computer readable program for causing a computer to start the active-standby switching between the active site and the standby site in the following way:
sending an instruction to the service interception module and the client interception module, triggering internal logic switching of various subsystems within the service delivery platform.

3. The system according to claim 2, wherein, the service interception module comprising a non-transitory computer readable storage medium having a computer readable program for causing a computer to set the service interception port as available or unavailable according to the instruction in the following way:
according to the instruction, setting a service interception port of the active site as unavailable, and/or, setting a service interception port of the standby site as available.

4. The system according to claim 2, wherein, the client interception module comprising a non-transitory computer readable storage medium having a computer readable program for causing a computer-to start or close the link between the service delivery platform and the service engine according to the instruction in the following way:
according to the instruction, starting the link between the service delivery platform on the standby site and the service engine, and/or, closing the link between the service delivery platform on the active site and the service engine.

5. The system according to claim 1, wherein, the intelligent recognition module comprises a non-transitory computer readable storage medium having a computer readable program for causing a computer to judge whether a preset switching rule is satisfied in the following way:
determining that the switching rule is satisfied when a duration of abnormity happening exceeds a tolerance duration threshold, and/or, the number of times of abnormity happening reaches a preset threshold in one preset time window, wherein the abnormity is happened on a core process, a critical link or a combination of the core process and the critical link of the service delivery platform each of which is pre-defined.

6. The system according to claim 1, wherein,
when the bidirectional monitoring modules, the intelligent recognition modules, the automatic switching modules, the client interception modules and the service interception modules are deployed on the active site and the standby site at the same time, the intelligent recognition modules on the two sites perform backup for each other, one of the intelligent recognition modules is in a working state and the other one is in a sleep state, and the intelligent recognition module in the working state controls the automatic switching modules deployed on the active site and the standby site.

7. The system according to claim 1, wherein,
when the intelligent recognition modules, the automatic switching modules, the client interception modules and the service interception modules are deployed on the active site and the standby site at the same time, for any one of the automatic switching modules, the client interception modules and the service interception modules on the two sites, if the modules on both of the two sites work normally, then the modules are in the working state; if the modules on one site are normal and the modules on the other site are abnormal, then the normal modules take over the work of the abnormal modules.

8. The system according to claim 1, wherein,
when the bidirectional monitoring modules are deployed on the active site and the standby site at the same time, if the bidirectional monitoring modules on the two sites are normal, then both of the bidirectional monitoring modules are in the working state, and the bidirectional monitoring module, which is at the same site with the intelligent recognition module in the working state, reports the alarm information to the intelligent recognition module in the working state; if the bidirectional monitoring module on only one site is normal, the normal bidirectional monitoring module reports the alarm information to the intelligent recognition module in the working state.

9. A method of implementing geographic disaster tolerance switching on a service delivery platform, comprising:
monitoring an active site and a standby site of the service delivery platform, and generating alarm information when detecting that an abnormity occurs on the active site or the standby site and an alarm reporting condition is satisfied; and
judging whether a preset switching rule is satisfied according to the alarm information, and if the preset switching rule is satisfied, starting an active-standby switching between the active site and the standby site;
wherein the step of starting an active-standby switching between the active site and the standby site comprises:
triggering internal logic switching of various subsystems within the service delivery platform, setting a service interception port of the active site as unavailable, closing a link between the service delivery platform on the active site and a service engine;
and/or, setting a service interception port of the standby site as available, and starting a link between the service delivery platform on the standby site and the service engine.

10. The method according to claim 9, wherein, the step of judging whether a preset switching rule is satisfied comprises:
determining that the switching rule is satisfied when a duration of abnormity happening exceeds a tolerance duration threshold, and/or, the number of times of abnormity happening reaches a preset threshold in one preset time window, wherein the abnormity is happened on a core process, a critical link or a combination of the core process and the critical link of the service delivery platform each of which is pre-defined.

11. The method according to claim 9, wherein, at least on one of the active site and the standby site deploys with a bidirectional monitoring module, an intelligent recognition module, an automatic switching module, a client interception module and a service interception module, wherein:
the step of monitoring an active site and a standby site of the service delivery platform, and generating alarm information when detecting that an abnormity occurs on the active site or the standby site and an alarm reporting condition is satisfied comprises:
the bidirectional monitoring module monitoring the active site and the standby site of the service delivery platform, and reporting the alarm information to the intelligent recognition module when detecting that the abnormity occurs in the active site or the standby site and the alarm reporting condition is satisfied;
the step of judging whether a preset switching rule is satisfied according to the alarm information comprises:
the intelligent recognition module receiving the alarm information reported by the bidirectional monitoring module, and judging whether the preset switching rule is satisfied, if the preset switching rule is satisfied, then sending a disaster tolerance switching instruction to the automatic switching module;

the step of starting an active-standby switching between the active site and the standby site comprises:
after receiving the disaster tolerance switching instruction, the automatic switching module sending an instruction to the service interception module and the client interception module, triggering the internal logic switching of various subsystems within the service delivery platform;
after receiving the instruction sent by the automatic switching module, the service interception module setting a service interception port as available or unavailable according to the instruction; and
after receiving the instruction sent by the automatic switching module, the client interception module starting or closing a link between the service delivery platform and a service engine according to the instruction.

12. The method according to claim 11, further comprising:
when the bidirectional monitoring modules, the intelligent recognition modules, the automatic switching modules, the service interception modules and the client interception modules are deployed on the active site and the standby site at the same time, or, when the system comprises two groups of the bidirectional monitoring modules, the intelligent recognition modules, the automatic switching modules, the service interception modules and the client interception modules and the two groups are deployed on the active site and the standby site respectively, establishing a heartbeat connection between the same modules among the above modules deployed on the two sites, and detecting whether the opposite party works normally periodically.

13. The method according to claim 12, further comprising:
when the bidirectional monitoring modules, the intelligent recognition modules, the automatic switching modules, the client interception modules and the service interception modules are deployed on the active site and the standby site at the same time, the intelligent recognition modules on the two sites performing backup with each other, wherein one of the intelligent recognition modules is in a working state and the other one is in a sleep state, and the intelligent recognition module in the working state controls the automatic switching modules deployed on the active site and the standby site.

14. The method according to claim 12, further comprising:
when the intelligent recognition modules, the automatic switching modules, the client interception modules and the service interception modules are deployed on the active site and the standby site at the same time, for any one of modules among the automatic switching modules, the client interception modules and the service interception modules on the two sites, if the modules on both of the two sites work normally, then the modules all being in the working state; if the modules on one site are normal and the modules on the other site are abnormal, then the normal modules taking over the work of the abnormal modules.

15. The method according to claim 12, further comprising:
when the bidirectional monitoring modules are deployed on the active site and the standby site at the same time, if the bidirectional monitoring modules on the two sites are normal, then both of the bidirectional monitoring modules being in the working state, and the bidirectional monitoring module, which is at the same site with the intelligent recognition module in the working state, reporting the alarm information to the intelligent recognition module in the working state; if the bidirectional monitoring module on only one site is normal, the normal bidirectional monitoring module reporting the alarm information to the intelligent recognition module in the working state.

16. The system according to claim 6, wherein,
when the intelligent recognition modules, the automatic switching modules, the client interception modules and the service interception modules are deployed on the active site and the standby site at the same time, for any one of the automatic switching modules, the client interception modules and the service interception modules on the two sites, if the modules on both of the two sites work normally, then the modules are in the working state; if the modules on one site are normal and the modules on the other site are abnormal, then the normal modules take over the work of the abnormal modules.

17. The system according to claim 6, wherein,
when the bidirectional monitoring modules are deployed on the active site and the standby site at the same time, if the bidirectional monitoring modules on the two sites are normal, then both of the bidirectional monitoring modules are in the working state, and the bidirectional monitoring module, which is at the same site with the intelligent recognition module in the working state, reports the alarm information to the intelligent recognition module in the working state; if the bidirectional monitoring module on only one site is normal, the normal bidirectional monitoring module reports the alarm information to the intelligent recognition module in the working state.

* * * * *